(12) United States Patent
Langiano et al.

(10) Patent No.: US 6,624,960 B1
(45) Date of Patent: Sep. 23, 2003

(54) CURRENT SENSING DRUM/CLEANING WHEEL POSITIONING METHOD AND APPARATUS FOR MAGNETIC STORAGE SYSTEM

(75) Inventors: Michael Donald Langiano, Berthoud, CO (US); Christopher Turner, Longmont, CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 09/522,530

(22) Filed: Mar. 10, 2000

(51) Int. Cl.[7] .................................................. G11B 5/41

(52) U.S. Cl. ........................................ 360/69; 360/128

(58) Field of Search ........................... 360/69, 75, 128, 360/137

(56) References Cited

U.S. PATENT DOCUMENTS

| | | |
|---|---|---|
| 3,821,710 A | 6/1974 | Arciprete et al. |
| 3,962,727 A | 6/1976 | Kamimura et al. |
| 4,011,587 A | 3/1977 | Arter et al. |
| 4,099,211 A | 7/1978 | Hathaway |
| 4,106,065 A | 8/1978 | Ravizza |
| 4,125,881 A | 11/1978 | Eige et al. |
| 4,172,265 A | 10/1979 | Sakamoto et al. |
| 4,175,267 A | 11/1979 | Tachi |
| 4,215,377 A | 7/1980 | Norris |
| 4,293,879 A | 10/1981 | Heitmann et al. |
| 4,357,639 A | 11/1982 | Hama et al. |
| 4,390,915 A | 6/1983 | Matsuyama |
| 4,394,694 A | 7/1983 | Ninomiya et al. |
| 4,404,605 A | 9/1983 | Sakamoto |
| 4,412,260 A | 10/1983 | Stricklin et al. |

(List continued on next page.)

FOREIGN PATENT DOCUMENTS

| | | | |
|---|---|---|---|
| EP | 102 897 A1 | * | 3/1984 |
| JP | 1-290112 A | * | 11/1989 |
| JP | 56-22210 A | * | 3/1991 |
| JP | 6-325333 A | * | 11/1994 |
| JP | 7-192231 A | * | 7/1995 |
| JP | 10-105932 A | * | 4/1998 |

OTHER PUBLICATIONS

Pizzi, New Audio Recording Formats, Broadcast Engineering, Feb. 1993, pp. 60–63.

NT–1, Apr. 1992, pp. 43–55.

Sasake, T., Asltad, J., Younker, M., The NT Digital Mcro Tape Recorder, Goddard Conference on Mass Storage Systems and Technologies, Sep. 22–24, 1992, pp. 143–157.

*Primary Examiner*—David Hudspeth
*Assistant Examiner*—James L Habermehl
(74) *Attorney, Agent, or Firm*—The Law Office of Jessica Costa PC; Jessica Costa

(57) ABSTRACT

A cleaning wheel positioning mechanism for precisely controlling the contact pressure of a cleaning wheel against a recording drum in a magnetic recording system is presented. In accordance with the invention, the cleaning wheel positioning controller uses knowledge of the drum drive motor voltage (or current) to detect the contact pressure of the cleaning wheel against the drum. During a cleaning operation, which preferably occurs automatically during a periodic cycle, the cleaning wheel positioning controller first detects a reference drum motor voltage/current based on the drum drive motor voltage/current when the cleaning wheel is in its fully retracted position. Cleaning wheel positioning controller then monitors the drum drive motor voltage/current, and compares it to the reference drive motor voltage/current. When a predetermined amount of increase in drum drive motor voltage/current over the reference voltage/current value occurs, which indicates that the cleaning wheel is positioned against the drum, the cleaning wheel positioning controller effectuates the halting of movement of the cleaning wheel rack, preferably by turning off the cleaning wheel drive motor.

18 Claims, 7 Drawing Sheets

U.S. PATENT DOCUMENTS

| | | |
|---|---|---|
| 4,420,778 A | 12/1983 | Sakamoto |
| 4,467,373 A | 8/1984 | Taylor et al. |
| 4,484,236 A | 11/1984 | Wilkinson |
| 4,486,796 A | 12/1984 | Sakamoto |
| 4,491,886 A | 1/1985 | Saito et al. |
| 4,492,991 A | 1/1985 | Osada et al. |
| 4,554,598 A | 11/1985 | Tarbox et al. |
| 4,581,662 A | 4/1986 | Sato |
| 4,609,947 A | 9/1986 | Yamagiwa et al. |
| 4,614,991 A | 9/1986 | Murakami |
| 4,620,245 A | 10/1986 | Shimizu |
| 4,628,372 A | 12/1986 | Morisawa |
| 4,628,383 A | 12/1986 | Miyamoto |
| 4,636,873 A | 1/1987 | Eguchi |
| 4,637,023 A | 1/1987 | Lounsbury et al. |
| 4,641,210 A | 2/1987 | Ohyama |
| 4,642,714 A | 2/1987 | Miyamoto |
| 4,644,414 A | 2/1987 | Yamada et al. |
| 4,651,239 A | 3/1987 | Omori et al. |
| 4,654,731 A | 3/1987 | Froschl et al. |
| 4,663,673 A | 5/1987 | Doutsubo |
| 4,665,447 A | 5/1987 | Odaka |
| 4,677,504 A | 6/1987 | Yamazaki et al. |
| 4,680,654 A | 7/1987 | Shibuya |
| 4,682,247 A | 7/1987 | Doutsubo |
| 4,688,109 A | 8/1987 | Sangu |
| 4,703,373 A | 10/1987 | Oosaka |
| 4,714,971 A | 12/1987 | Sigiki et al. |
| 4,717,974 A | 1/1988 | Baumeister |
| 4,731,678 A | 3/1988 | Takeuchi |
| 4,737,865 A | 4/1988 | Murakami et al. |
| 4,739,420 A | 4/1988 | Odaka et al. |
| 4,758,904 A | 7/1988 | Takashashi et al. |
| 4,758,911 A | 7/1988 | Nakano et al. |
| 4,760,474 A | 7/1988 | Takimoto |
| 4,769,811 A | 9/1988 | Eckberg, Jr. et al. |
| 4,774,605 A | 9/1988 | Kato |
| 4,786,011 A | 11/1988 | Fujiwara et al. |
| 4,796,115 A | 1/1989 | Ohshima et al. |
| 4,799,221 A | 1/1989 | Fukami et al. |
| 4,802,172 A | 1/1989 | Fukami et al. |
| 4,821,129 A | 4/1989 | Culp |
| 4,835,628 A | 5/1989 | Hinz et al. |
| 4,843,495 A | 6/1989 | Georgis et al. |
| 4,845,577 A | 7/1989 | Georgis et al. |
| 4,897,739 A | 1/1990 | Hasegawa et al. |
| 4,918,546 A | 4/1990 | Saito |
| 4,930,027 A | 5/1990 | Steele et al. |
| 4,933,784 A | 6/1990 | Oldershaw et al. |
| 4,935,824 A | 6/1990 | Nakano et al. |
| 4,935,827 A | 6/1990 | Oldershaw et al. |
| 4,970,612 A | 11/1990 | Renders et al. |
| 4,977,469 A | 12/1990 | Yokozawa |
| 4,984,104 A | 1/1991 | Takahashi et al. |
| 5,003,411 A | 3/1991 | Nagahara et al. |
| 5,034,833 A | 7/1991 | Marlowe |
| 5,050,018 A | 9/1991 | Georgis et al. |
| 5,068,757 A | 11/1991 | Hughes et al. |
| 5,103,355 A | 4/1992 | Steele |
| 5,115,500 A | 5/1992 | Larsen |
| 5,142,422 A | 8/1992 | Zook et al. |
| 5,191,491 A | 3/1993 | Zweighaft |
| 5,251,077 A | 10/1993 | Saitoh |
| 5,262,905 A | 11/1993 | Takagi et al. |
| 5,327,305 A | 7/1994 | Thomas |
| 5,349,481 A | 9/1994 | Kauffman et al. |
| 5,414,570 A | 5/1995 | Fry et al. |
| 5,535,068 A | 7/1996 | Hughes |
| 5,602,694 A | 2/1997 | Miles et al. |
| 5,633,764 A | 5/1997 | Ohta |
| 5,781,688 A | 7/1998 | Seong |
| 5,872,997 A | 2/1999 | Golson |
| 5,953,177 A | 9/1999 | Hughes |
| 6,411,083 B1 * | 6/2002 | Inaba ........................ 360/31 X |

* cited by examiner

CURRENT SENSING DRUM/CLEANING WHEEL POSITIONING METHOD AND APPARATUS FOR MAGNETIC STORAGE SYSTEM

FIELD OF THE INVENTION

The present invention pertains generally to magnetic tape drives, and more particularly to a method and apparatus for precisely positioning a cleaning wheel against a recording drum in a magnetic tape recording system.

BACKGROUND OF THE INVENTION

In a magnetic recording system that uses a motor actuated mechanical gear, rack, and pinion system to position a felt cleaning wheel against the recording drum, the prior art presents two types of solutions. In the first solution, a precision positioning mechanism is used to maintain a constant contact force against the drum. This solution is problematic in that it is costly in terms of components and engineering design time, which therefore increases the overall cost of the system.

In today's competitive recording technology market, where the difference in a few dollars between competitive product can give a company an edge over its competitors, solutions for lowering the manufacturing costs of the product are continually sought out. Accordingly, many lower-cost tape drives employ a low cost cleaning wheel positioning mechanism instead of the more precise and costly mechanism described above. This system is essentially an open-loop system which actuates a cleaning wheel positioning motor in proportion to a predetermined fixed positional target in the cleaning wheel transport mechanism. The cleaning wheel is positioned to the fixed positional target along the path of the cleaning wheel transport mechanism. The relative position of the recording drum is not sensed, and the mechanical tolerances of the system play a large role in how precise the positioning can be done. The fixed positional target is individually calibrated at the factory for each drive since, due to component tolerance variance, the distance between the drum and cleaning wheel in individual drives can vary. However, this open-loop approach is problematic since between repeated cleaning operations on any given drive, the distance between the drum and cleaning wheel can vary due to excessive gear backlash and other mechanical imprecisions. This cleaning operation positioning variance often results in the cleaning wheel not contacting the drum at all during a cleaning wheel "touch" operation, or in the cleaning wheel pressing too hard against the drum thereby resulting in damage to the recording heads, the drum surface, and to the cleaning wheel itself.

Accordingly, a need exists for a more precise and less costly technique for positioning the cleaning wheel against the recording drum during a cleaning operation. It would be desirable that this technique operated consistently from tape drive unit to tape drive unit and over temperature and voltage variations. Furthermore, it would be desirable to have such a technique without requiring additional components.

SUMMARY OF THE INVENTION

The present invention is a novel method and apparatus for precisely positioning a cleaning wheel against a recording drum during a cleaning operation. In particular, the present invention allows cleaning wheel positioning control that is consistent from drive to drive and over varying temperature and manufacturing process variations. Furthermore, the present invention allows precise control without requiring additional components that add to cost, complexity, and test time.

In accordance with the invention, in a tape drive mechanism that actuates the cleaning wheel against the recording drum during a cleaning operation, the contact pressure between the cleaning wheel and recording drum during a cleaning operation is controlled by constantly monitoring the recording drum drive motor current (and/or closed loop speed control voltage). While sensing the drum voltage/current feedback, the cleaning wheel is slowly transported towards the recording drum until an increase in drum motor drive voltage/current is detected. The increase in drum motor drive voltage/current is cause by the increased torque load incident on the drum as a result of the contact pressure between the drum and cleaning wheel. This method eliminates the need for precisely determining a fixed positional target for the cleaning wheel transport and its associated individual drive calibration at the factory. It also effectively and inexpensively provides precision-controlled contact force between the cleaning wheel and drum while remaining completely immune to positioning inaccuracies due to component tolerance variances from drive to drive and between cleaning operations.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel method and apparatus for precisely positioning a cleaning wheel against a recording drum during a cleaning operation is described in detail hereinafter.

Figure 1:
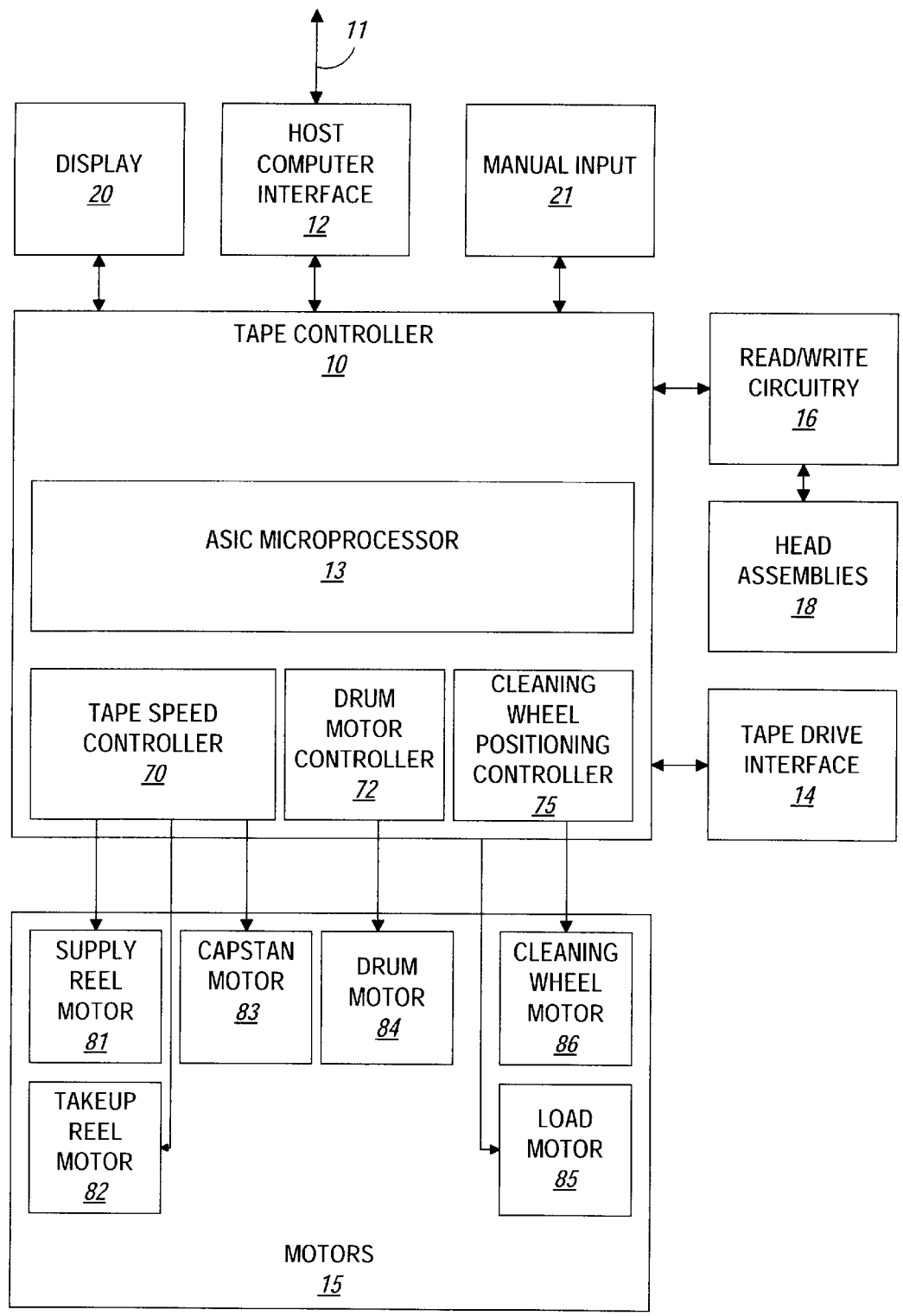
FIG. 1 is a block diagram of a tape drive in accordance with the invention.

FIG. 1 is a block diagram illustrating the functionality of a tape drive in accordance with the invention. Tape controller 10 manages a plurality of functionally separated blocks, including a host computer interface 12, a tape drive interface 14 which electromechanically cooperates with motors 15 for performing various drive functions, and read/write circuitry 16 which response to commands from the controller 10 to perform reading and writing functions relative to the tape through head assemblies 18. Interaction with the user is through display 20 and manual input 21. Typically, tape controller 10 is an application specific integrated circuit (ASIC) that includes a microprocessor 13. Tape controller 10 interfaces with a host system via a host system interface 12, and with the tape drive via the tape drive interface 14. Controller 10 performs a variety of functions including among others speed and direction control of all motors, data formatting and unformatting, and generation and use of error correction. Read/write circuitry 16 manages the conversion of digital data from tape controller 10 into analog signals that are appropriate for the recording heads 18 and vice versa.

Motors 15 includes reel motor 81, capstan motor 83, drum motor 84, load motor 85, and cleaning wheel motor 86. Reel motor 81 drives the supply and take-up reels of the tape cartridge to transport the tape in either the forward or reverse direction. Capstan motor 83 drives the capstan, which is responsible for regulating tape speed. The capstan motor 83 is bidirectional and can drive the tape in the forward or reverse direction. Drum motor 84 drives the rotating heads assembly 40 that scans the tape surface in a helical pattern. Load motor 85 controls the load mechanism which loads the tape around the tape path for reading or recording when a tape cartridge is inserted into the drive, and unloads the tape from around the tape path when the tape cartridge is ejected from the drive. Cleaning wheel motor 86 controls the application of the cleaning wheel against the recording heads on the drum during a cleaning operation and the retraction s of the cleaning wheel away from the recording heads upon completion of a cleaning operation.

Figure 2:
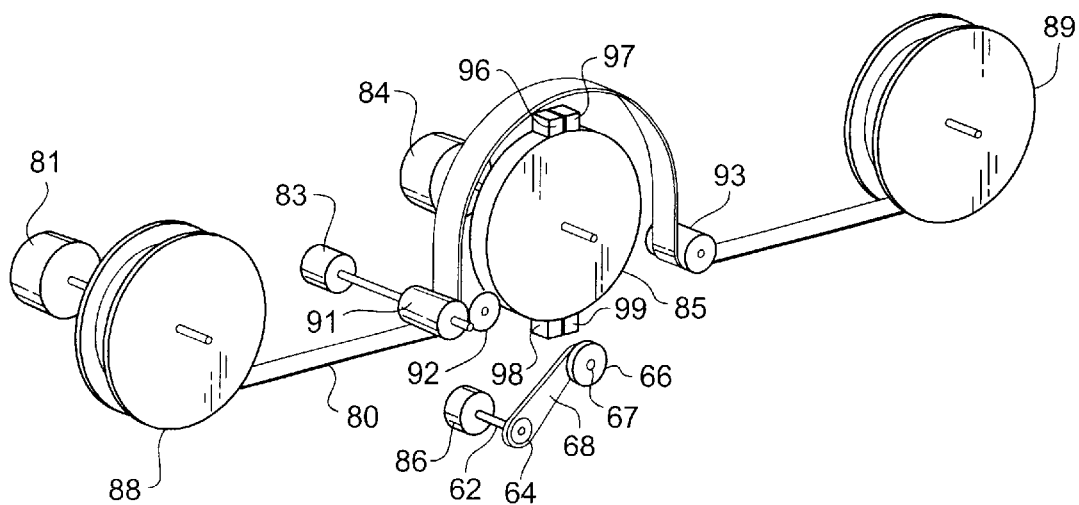
FIG. 2 is a top angular view of a tape path in one embodiment of the tape transport mechanism.
Figure 3:
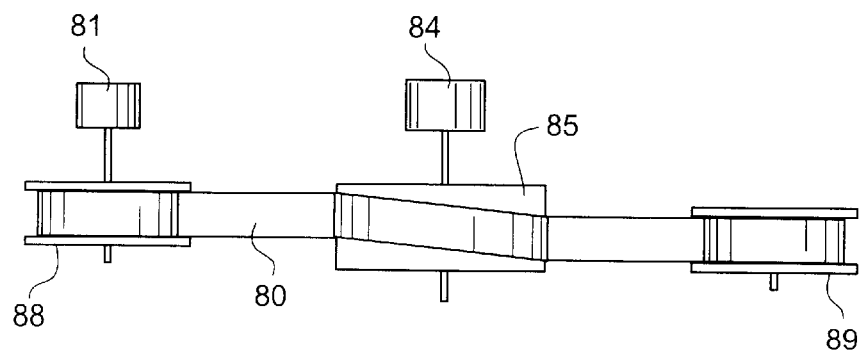
FIG. 3 is a side view of the tape transport mechanism of FIG. 2.
Figure 4:
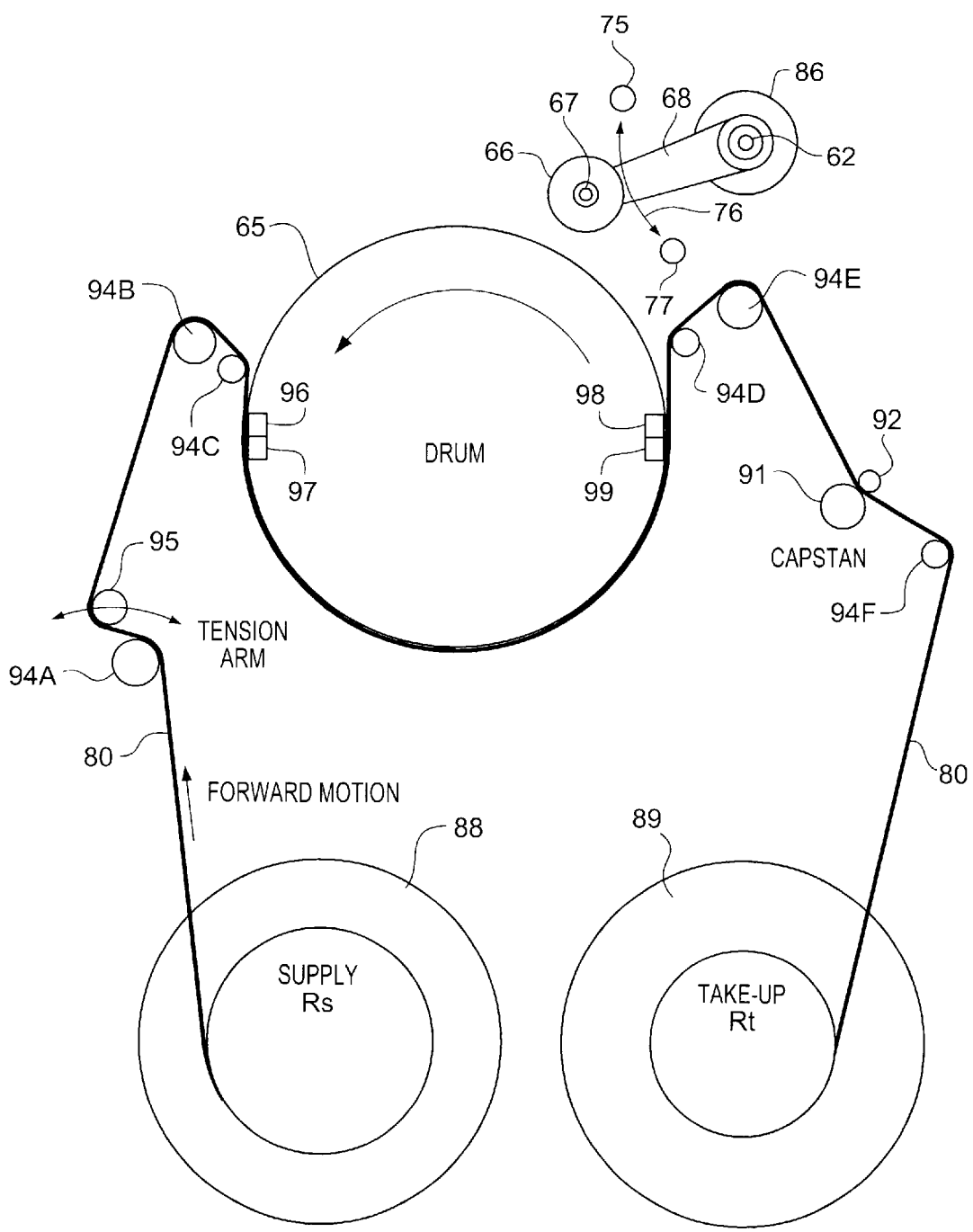
FIG. 4 is a top view of the tape transport mechanism of FIG. 2.

The tape drive in the illustrative embodiment utilizes an 8 mm tape cartridge that has tracks recorded thereon in a helical scan pattern. FIG. 2 is a top angular view and FIG. 3 is a side view of the tape path resulting from one arrangement of tape drive motors of a helical scan tape drive. FIG. 4 is a top view of the tape drive configuration of FIGS. 2 and 3, illustrating the path followed by tape 80 and positioning of the cleaning wheel system.

In the illustrative embodiment, data is written in tracks in an alternate azimuth, helical pattern by heads 96–99 on drum rotor 85 with an alternate azimuth technique. That is, a pair of alternate azimuth data tracks are recorded simultaneously at an angle across the tape by a pair alternate azimuth adjacent write heads. Tape speed controller 70 maintains the period of drum rotor 65 and speed of tape 80. Data is checked half a drum rotation after writing by a pair of alternate azimuth CAW heads located 180 degrees relative to the pair of write heads, and offending tracks re-written "on the fly" as required. Accordingly, for each rotation of drum rotor 65, two tracks are written and a write check of those two tracks is performed. Data is read with all four heads 96–99 using an alternate azimuth reading technique.

Drum 65 cooperates with capstan 91 and idler rollers 92 and 93 to retain the tape 80 in an arc of 196 degrees relative to the circumferential periphery of drum 65. Capstan 91 is operated by capstan motor 83 so as to modify the position of tape 80 relative to the path of head 96, 97, 98, 99 rotating on drum 65 to maximize the rate at which packets are read from tape 80. In other words, the relationship between tape position (or track position) and the path of the read/write heads is adjustable to alter the rate at which data is read from the tape. In the illustrative embodiment, data is read over a continuously variable transfer rate of up to a maximum of over 100% of the rate at which data is nominally recorded.

As shown in FIGS. 2–4, tape 80 circulates between supply reel 88 and take-up reel 89 after passing over a series of idler rollers 94a, 94b, 94c, 94d, 94e, and 94f, a biased tension arm and roller 95, and between capstan 91 and pinch roller 92. Drum 65 rotates so as to magnetically exchange data between heads 96–99 mounted thereon and tape 80 as it passes over the periphery of the drum 65.

Figure 5A:
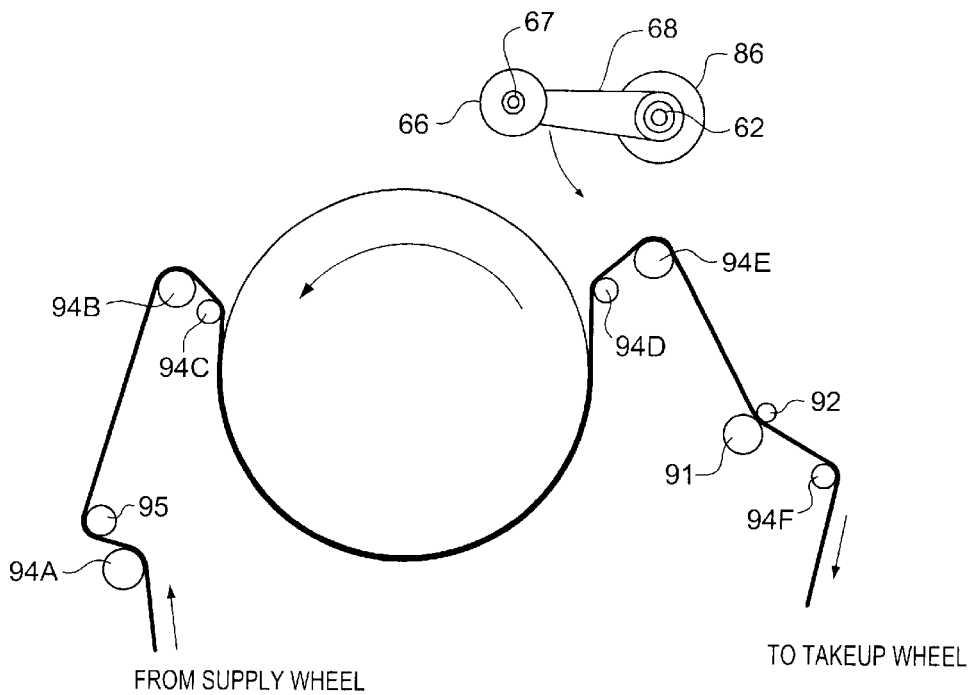
FIGS. 5A–5D are top views of the tape transport mechanism illustrating the positioning of the cleaning wheel system.

The present invention is a cleaning wheel positioning controller 75 which precisely controls the positioning of the cleaning wheel against the recording heads 96–99 of drum 65 during a cleaning operation. FIGS. 5A–5D are top view diagrams illustrating the varying positions of the cleaning wheel from a fully retracted position to a fully extended position. FIG. 5A is a top view of the cleaning system and illustrates the system when the cleaning wheel rack is in its fully retracted position. With reference to FIGS. 2 and 4, cleaning system includes cleaning wheel 66 mounted on cleaning wheel shaft 67. Cleaning wheel shaft 67 is transversely and rotatably mounted on a linear gear 68. Gear 68 is fixedly mounted on cleaning wheel motor shaft 62, which is rotatable by cleaning wheel motor 86 in the form of a rotary actuator. In operation, cleaning wheel motor 86 rotates cleaning wheel motor shaft 62, which in turn causes linear gear 68 to translate in either direction indicated by arrow 76 between a fully retracted position shown at point 75 and a fully extended position shown at point 77. During a cleaning operation, cleaning wheel 66 is transported from fully retracted position 75 towards the recording drum 65 by actuation of the cleaning wheel motor 86 in a forward direction towards fully extended position 77.

Figure 5B:
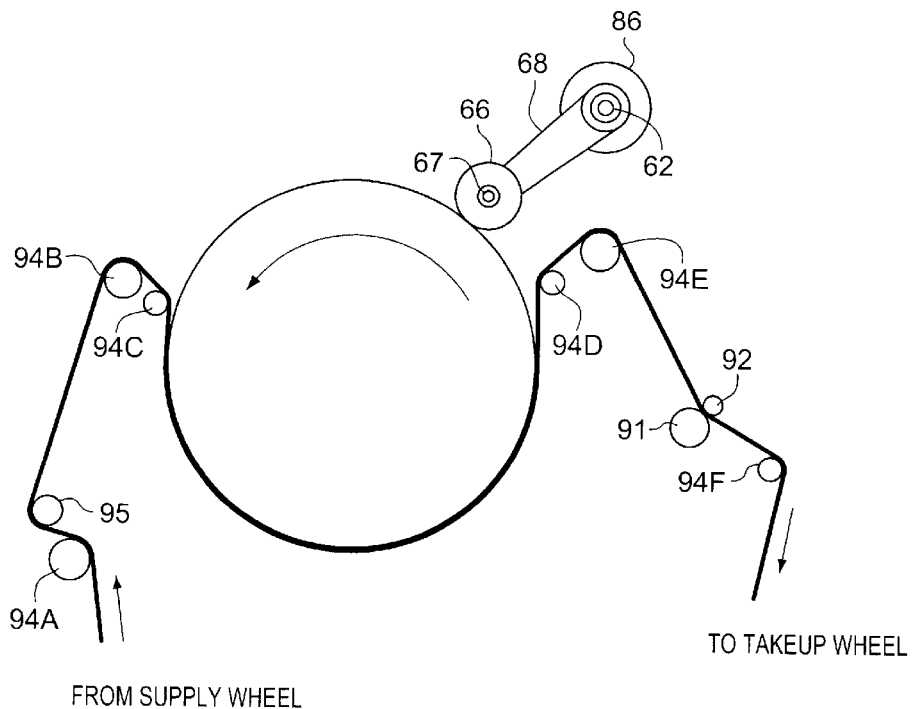
Figure 5C:
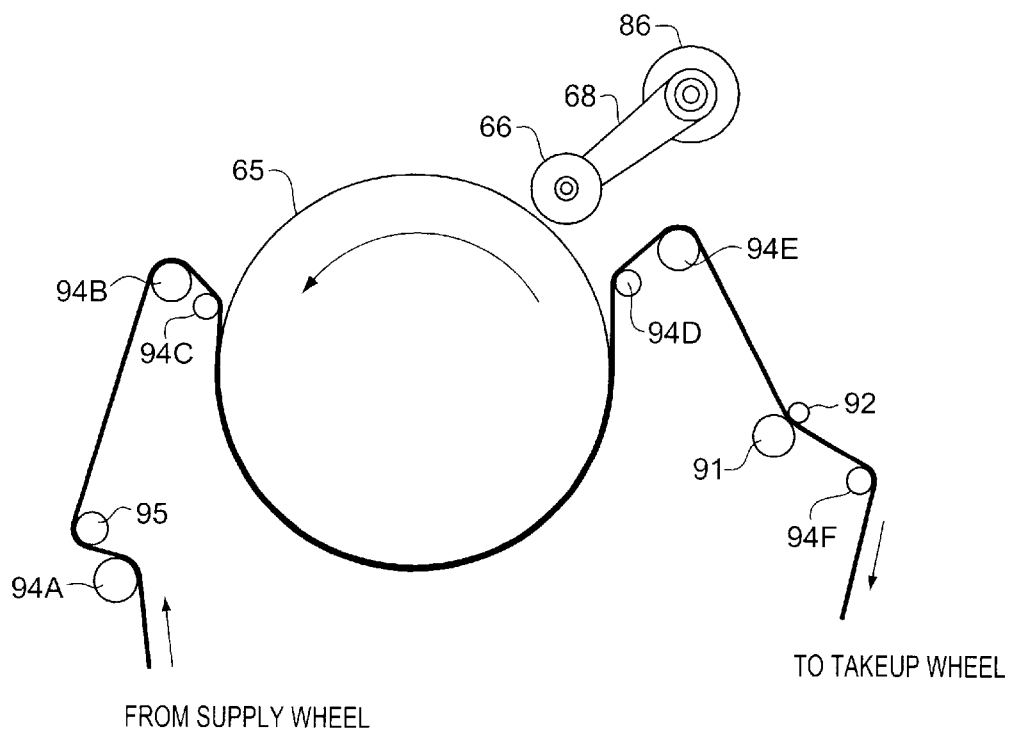
Figure 5D:
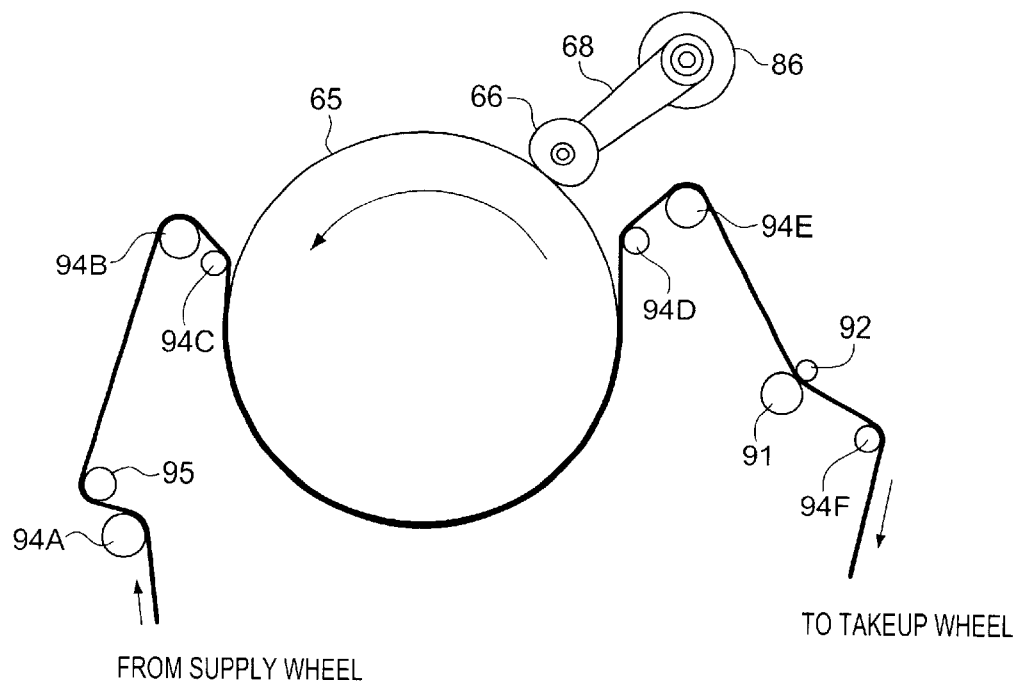

FIGS. 5B–5D illustrate the cleaning wheel system in its fully extended position 77. FIG. 5B illustrates the engagement of the cleaning wheel 66 with the drum 65 that results in ideal contact force for cleaning the recording heads. Without the implementation of the cleaning wheel positioning controller 75 of the invention, described hereinafter, the system is susceptible to variances in contact force between the cleaning wheel and drum, as illustrated in FIGS. 5C and 5D. FIG. 5C illustrates the case when the cleaning wheel system is fully extended, yet the cleaning wheel 66 itself does not actually contact the drum 65. This situation can occur when the linear gear 68 slips due to gear backlash. FIG. 5D illustrates the situation when the cleaning wheel system is fully extended and the cleaning wheel 66 is pressed to far against the drum 65. The cleaning wheel positioning controller 75 of the invention provides the tape drive with a precise measure of the contact force between the cleaning wheel 66 and drum 65 and prevents the cases illustrated in FIGS. 5C and 5D.

Figure 6:
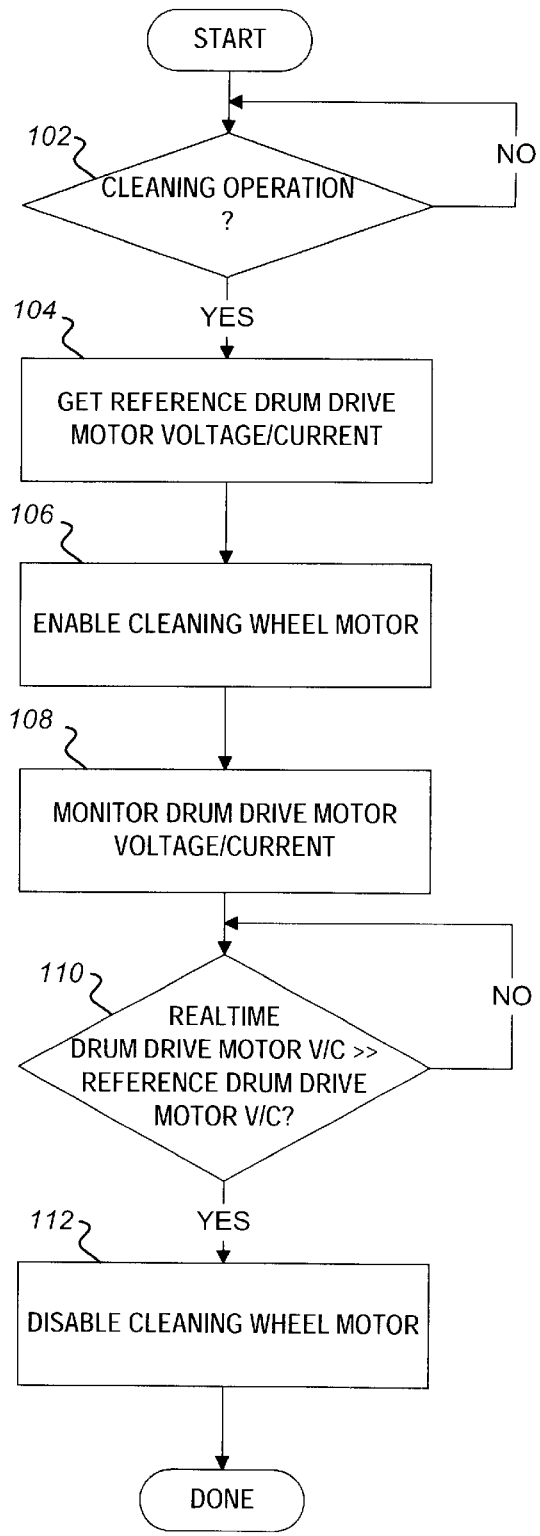
FIG. 6 is a flowchart of the operation of a cleaning wheel motor controller in accordance with the invention.

FIG. 6 is an operational flowchart of the method of the invention. At the beginning of a cleaning cycle, which preferably occurs automatically during a periodic cycle, as determined in step 102, a reference drum drive motor voltage/current is obtained 104. The reference value is the nominal drum drive motor voltage/current applied to the drum drive motor when the cleaning wheel is not in contact with the drum, i.e., when the cleaning wheel rack is in its fully retracted position. The cleaning wheel motor is enabled 106, preferably by the application of a predetermined nominal value of the driving voltage/current to the cleaning wheel motor, to actuate the transport of the cleaning wheel towards the recording drum. The drum drive motor voltage/current applied to the drum drive motor is then monitored 108 in real time and compared 60 to the reference voltage/current. While the monitored drum drive motor voltage/current remains within a predetermined range of the reference voltage/current, the continued application of the predetermined nominal value of the driving voltage/current to the cleaning wheel motor is maintained in order to continue the transport of the cleaning wheel towards the recording drum. The monitoring 108 of the real time drum drive motor voltage/current and comparison 110 to the reference voltage/ current is repeated until a significant increase in drum drive motor voltage/current above the reference voltage/current is detected. The increase in drum drive motor voltage/current indicates contact pressure between the cleaning wheel and drum. More particularly, the increase in drum motor drive voltage/current is caused by the increased torque load incident on the drum as a result of the contact pressure between the drum and cleaning wheel. Once this condition is detected, the cleaning wheel motor is disabled 112, preferably by removing the application of the predetermined nominal value of the driving voltage/current to the cleaning wheel motor, in order to stop the transport of the cleaning wheel towards the recording drum.

In accordance with the invention, cleaning wheel positioning controller 75 uses knowledge of the drum drive motor 84 voltage or current to detect the contact pressure of the cleaning wheel 66 against the drum 65. During a cleaning operation, which preferably occurs automatically according to a periodic cycle, the cleaning wheel positioning controller 75 first detects a reference drum motor voltage/current based on the drum drive motor voltage/current when the cleaning wheel is in its fully retracted position 75. Cleaning wheel positioning controller 75 then monitors the drum drive motor voltage/current, and compares it to the reference drive motor voltage/current. When a significant increase in drum drive motor voltage/current over the reference voltage/current value is detected, the cleaning wheel positioning controller 75 effectuates the halting of movement of the cleaning wheel, preferably by removing the application of driving voltage/current to the drum motor 84.

Figure 7:
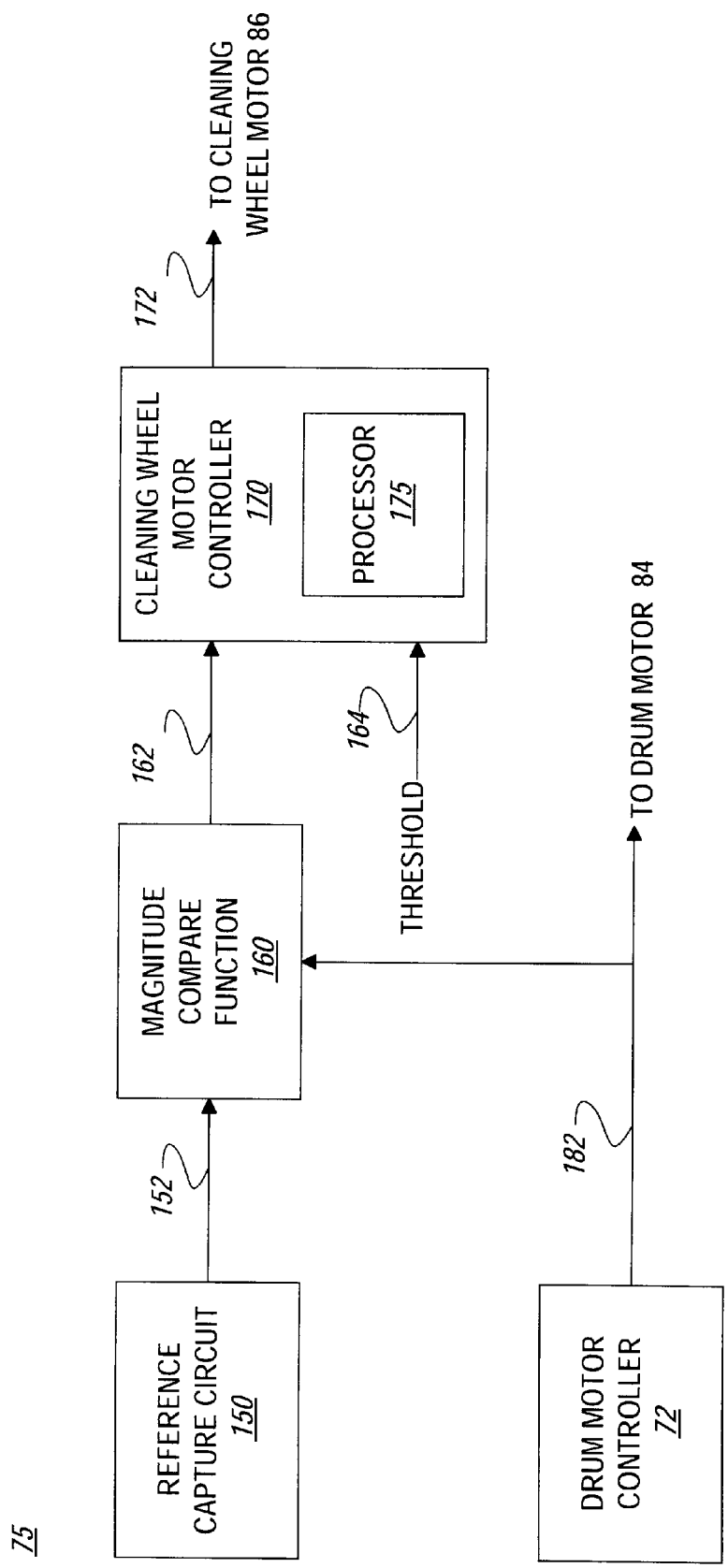
FIG. 7 is a block diagram of one preferred embodiment of a cleaning wheel motor controller in accordance with the invention.

FIG. 7 is a block diagram of one embodiment of the cleaning wheel positioning controller 75 in accordance with the invention. As illustrated, cleaning wheel positioning controller 75 monitors the relationship between a reference drum drive motor voltage/current 152 and the real-time drum drive motor voltage/current 182. As illustrated, cleaning wheel positioning controller 75 includes a reference capture circuit 150, a magnitude compare function 160, and a cleaning wheel motor adjustment circuit 170.

Reference capture circuit 150 captures the reference drum drive motor voltage/current 152 at the beginning of a cleaning operation. Preferably, the reference drum drive motor voltage/current 152 is the value of the voltage/current 182 driving the drum motor 84 when the cleaning wheel system is in its fully retracted position 75 such that the cleaning wheel is guaranteed to exert no contact pressure on the drum 65.

Magnitude compare function 160 receives and compares the reference drum drive motor voltage/current 152 and the real-time drum drive motor voltage/current 182. Magnitude compare function 160 generates magnitude compare function output signal 162. Magnitude compare function output signal 162 may proportionally represent the difference in reference voltage/current 152 and realtime voltage/current 172, or alternatively may be a binary enable signal that indicates whether or not the realtime voltage/current 182 has met or exceeded the reference/realtime voltage/current difference threshold.

In the case that the magnitude compare function output signal 162 proportionally represents the difference in reference voltage/current 152 and realtime voltage/current 172, cleaning wheel controller 170, preferably implemented with a microprocessor 175, performs a comparison of the magnitude compare function output signal 162 to a predetermined reference/realtime voltage/current difference threshold 164. The predetermined reference/realtime voltage/current difference threshold is set to a value that if reached, indicates that the cleaning wheel 66 has achieved ideal contact pressure against the drum 65. As described previously, the drum motor controller 72 drives the drum 65 with a drum drive motor voltage/current 182, adjusting the amount of voltage/current to maintain a constant rotational speed of the drum 65. As the cleaning wheel 66 begins to make contact with the drum 65, the cleaning wheel 66 exerts frictional force on the surface of the drum 65 and the amount of voltage/current increases in order to maintain the constant speed of the drum 65. The difference in voltage/current between the nominal voltage/current required to maintain constant drum speed when the cleaning wheel 66 is not in contact with the drum 65 and when the cleaning wheel 66 exerts an ideal amount of contact pressure against the drum 65 during a cleaning operation is a measurable value. The predetermined reference/realtime voltage/current difference threshold 164 is set to this measurable value. As long as the magnitude compare function output signal 162 indicates that the realtime drum drive motor voltage/current 182 has not increased over the reference voltage/current 152 by the reference/realtime voltage/current difference threshold 164, cleaning wheel controller 170 applies a predetermined cleaning wheel motor drive voltage/current 172 to the cleaning wheel motor 86. Once the cleaning wheel motor controller 170 detects from the magnitude compare function output signal 162 that the realtime drum drive motor voltage/current 182 has increased over the reference voltage/current 152 by an amount equal to the reference/realtime voltage/current difference threshold 164, cleaning wheel motor controller 170 disables further transport of the cleaning wheel 66 towards the recording drum 65 by turning off the application of cleaning wheel motor drive voltage/current 172 to the cleaning wheel motor 86.

In the case that the magnitude compare function output signal 162 is implemented as a binary enable signal that indicates whether or not the realtime voltage/current 182 has met or exceeded the reference/realtime voltage/current difference threshold 164, it is the magnitude compare function 160 that performs the reference/realtime voltage/current comparison and the magnitude compare function output signal 162 is implemented as a motion enable signal which is true when the difference between the reference drum drive motor voltage/current 152 and realtime drum drive motor voltage/current 182 has not yet met the reference/realtime voltage/current difference threshold. This indicates that the cleaning wheel 66 has not yet exerted the ideal contact pressure on the drum 65. As long as the motion enable signal 162 is true, cleaning wheel controller 170 applies a predetermined drive voltage/current 172 to the cleaning wheel motor 86 in order to transport the cleaning wheel 66 towards the drum 65. Once the cleaning wheel exerts the ideal amount of contact force against the drum 65, the motion enable signal 162 goes false, and the cleaning wheel motor controller 170 disables further motion of the cleaning wheel 66 towards the recording drum 65 by turning off the application of cleaning wheel motor drive voltage/current 172 to the cleaning wheel motor 86.

It will be appreciated from the above detailed description that the invention solves the cleaning wheel positioning problem by creating a controlled contact pressure between the cleaning wheel and the recording drum during a clean operation. The invention does not rely on the positional accuracy of the cleaning wheel transport mechanism. The advantage to this is that the cleaning wheel transport mechanism can be much less costly than one that would give more precise positioning control. Also, the cleaning wheel transport mechanism does not need to be calibrated at the factory.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for precisely positioning a cleaning wheel during a cleaning operation in a magnetic storage system, said magnetic storage system comprising a rotating drum comprising at least one read and/or write head, a drum motor which actuates rotation of said drum in response to a drum drive motor voltage and/or current (voltage/current), a drum motor controller which generates said drum drive motor voltage/current to maintain a constant rotational speed of said drum, and a cleaning wheel, said method comprising the steps of:

obtaining a reference drum drive motor voltage/current;

actuating said cleaning wheel in a direction towards said recording drum;

monitoring said drum drive motor voltage/current in realtime;

halting said actuating of said cleaning wheel towards said recording drum if a predetermined amount of increase in drum drive motor voltage/current above the reference voltage/current is detected.

2. The method of claim 1, wherein:

said reference drum drive motor voltage/current comprises the amount of said drum drive motor voltage/current applied to the drum motor when the cleaning wheel is not in contact with the drum.

3. The method of claim 2, wherein:

said reference drum drive motor voltage/current comprises the amount of said drum drive motor voltage/current applied to the drum drive motor when the cleaning wheel is in a fully retracted position.

4. The method of claim 1, wherein said actuating step comprises:

actuating a cleaning wheel motor which actuates said cleaning wheel in a direction towards said drum by applying a predetermined cleaning wheel driving voltage/current to said cleaning wheel motor.

5. The method of claim 4, wherein said halting step comprises:

removing the application of said cleaning wheel driving voltage/current to said cleaning wheel motor.

6. The method of claim 1, comprising:

retracting said cleaning wheel away from contact with said drum upon completion of said cleaning operation.

7. A cleaning wheel motor controller for precisely positioning a cleaning wheel during a cleaning operation in a magnetic storage system, said magnetic storage system comprising a rotating drum comprising at least one read and/or write head, a drum motor which actuates rotation of said drum in response to a drum drive motor voltage and/or current (voltage/current), a drum motor controller which generates said drum drive motor voltage/current to maintain a constant rotational speed of said drum, and a cleaning wheel, said cleaning wheel motor controller comprising:

an actuating motor which actuates said cleaning wheel in a direction towards said recording drum;

a magnitude comparator which monitors said drum drive motor voltage/current in realtime;

a processor which controls said actuating motor and which directs said actuating motor to actuate said cleaning wheel in a direction towards said drum during a cleaning operation if said monitored realtime drum drive motor voltage/current has not increased over a reference drum drive motor voltage/current by a predetermined reference/realtime voltage/current difference threshold and which directs said actuating motor to halt said actuating of said cleaning wheel towards said recording drum if said monitored realtime drum drive motor voltage/current has increased over said reference drum drive motor voltage/current by said predetermined reference/realtime voltage/current difference threshold.

8. The cleaning wheel motor controller of claim 7, comprising:

a reference capture circuit which captures said reference drum drive motor voltage/current.

9. The cleaning wheel motor controller of claim 8, wherein: said reference drum drive motor voltage/current comprises the amount of said drum drive motor voltage/current applied to the drum drive motor when the cleaning wheel is not in contact with the drum.

10. The cleaning wheel motor controller of claim 8, wherein:

said reference drum drive motor voltage/current comprises the amount of said drum drive motor voltage/current applied to the drum drive motor when the cleaning wheel is in a fully retracted position.

11. The cleaning wheel motor controller of claim 7, wherein:

said processor causes said cleaning wheel to be retracted away from contact with said drum upon completion of said cleaning operation.

12. A recording head cleaning system for a magnetic tape drive, comprising:

a rotating recording drum comprising at least one read and/or write (read/write) head;

a drum motor which actuates rotation of said drum in response to a drum drive motor voltage and/or current (voltage/current);

a drum motor controller which generates said drum drive motor voltage/current to maintain a constant speed of revolution of said drum;

a cleaning wheel;

a cleaning wheel motor; and a cleaning wheel motor controller which obtains a reference drum drive motor voltage/current, actuates said cleaning wheel in a direction towards said recording drum during a cleaning operation; monitors said drum drive motor voltage/current in realtime; and halts said actuating of said cleaning wheel towards said recording drum if a predetermined amount of increase in drum drive motor voltage/current above the reference voltage/current is detected.

13. The cleaning system of claim 12, wherein:

said cleaning wheel motor controller retracts said cleaning wheel away from contact with said drum upon completion of said cleaning operation.

14. The cleaning system of claim 12, wherein said cleaning wheel motor controller comprises:

an actuating motor which actuates said cleaning wheel in a direction towards said recording drum;

a magnitude comparator which monitors said drum drive motor voltage/current in realtime;

a processor which controls said actuating motor and which directs said actuating motor to actuate said cleaning wheel in a direction towards said drum during a cleaning operation if said monitored realtime drum drive motor voltage/current has not increased over said reference drum drive motor voltage/current by a predetermined reference/realtime voltage/current difference threshold and which directs said actuating motor to halt said actuating of said cleaning wheel towards said recording drum if said monitored realtime drum drive motor voltage/current has increased over said reference drum drive motor voltage/current by said predetermined reference/realtime voltage/current difference threshold.

15. The cleaning system of claim 14, wherein said cleaning wheel motor controller comprises:

a reference capture circuit which captures said reference drum drive motor voltage/current.

16. The cleaning system of claim 14, wherein:

said processor causes said cleaning wheel to be retracted away from contact with said drum upon completion of said cleaning operation.

17. The cleaning system of claim 12, wherein:

said reference drum drive motor voltage/current comprises the amount of said drum drive motor voltage/current applied to the drum drive motor when the cleaning wheel is not in contact with the drum.

18. The cleaning system of claim 12, wherein:

said reference drum drive motor voltage/current comprises the amount of said drum drive motor voltage/current applied to the drum drive motor when the cleaning wheel is in a fully retracted position.

* * * * *